US012021819B2

(12) United States Patent
Tanaka et al.

(10) Patent No.: US 12,021,819 B2
(45) Date of Patent: Jun. 25, 2024

(54) MESSAGE COMMUNICATION METHOD AND STORAGE MEDIUM FOR CONTROLLING TRANSMISSION OF MESSAGES BASED ON AN OPT-IN OR OPT-OUT STATUS

(71) Applicant: ACCRETE, INC., Tokyo (JP)

(72) Inventors: Yusei Tanaka, Tokyo (JP); Keiichi Kamikawa, Tokyo (JP); Takashi Minami, Tokyo (JP)

(73) Assignee: ACCRETE, INC., Tokyo (JP)

( * ) Notice: Subject to any disclaimer, the term of this patent is extended or adjusted under 35 U.S.C. 154(b) by 0 days.

(21) Appl. No.: 18/201,056

(22) Filed: May 23, 2023

(65) Prior Publication Data
US 2023/0300099 A1 Sep. 21, 2023

Related U.S. Application Data

(63) Continuation of application No. PCT/JP2021/040146, filed on Oct. 29, 2021.

(30) Foreign Application Priority Data

Nov. 24, 2020 (JP) ................. 2020-194563

(51) Int. Cl.
*H04L 51/48* (2022.01)
*H04L 51/58* (2022.01)
(Continued)

(52) U.S. Cl.
CPC .............. *H04L 51/48* (2022.05); *H04L 51/58* (2022.05); *H04L 61/106* (2013.01); *H04L 2101/65* (2022.05)

(58) Field of Classification Search
CPC ....... H04L 51/48; H04L 51/58; H04L 61/106; H04L 2101/65
See application file for complete search history.

(56) References Cited

U.S. PATENT DOCUMENTS 9,773,257 B1 * 9/2017 Bodell ............... G06Q 30/0251
11,165,731 B1 * 11/2021 Donohue ................ H04L 51/58
(Continued)

FOREIGN PATENT DOCUMENTS

| CN | 101996354 A | 3/2011 |
| CN | 109219004 A | 1/2019 |

(Continued)

OTHER PUBLICATIONS

International Search Report and Written Opinion; Application No. PCT/JP2021/040146; dated Nov. 30, 2021.

*Primary Examiner* — Blake J Rubin
(74) *Attorney, Agent, or Firm* — Fitch, Even, Tabin & Flannery LLP (57) ABSTRACT

The disclosed technique provides a message communication method comprising: receiving, from a client providing a message delivery service to a user of the client, an address of the user and a message to be transmitted to the address, the address being a phone number of the user or an address equivalent to the phone number; searching a database by using the address and outputting a first search result; associating the address with an opt-in status and storing the address in the database in a case where the first search result indicates that there was no hit for the address; controlling transmission of the message in such a manner as to inhibit the transmission of the message to the address in a case where the first search result indicates that the address has an opt-out status, and to transmit the message to the address in a case where the first search result indicates that the address has an opt-in status or that there was no hit for the address.

6 Claims, 6 Drawing Sheets

(51) Int. Cl.
*H04L 61/106* (2022.01)
*H04L 101/65* (2022.01)

(56) References Cited

U.S. PATENT DOCUMENTS

| | | |
|---|---|---|
| 2009/0327065 A1 | 12/2009 | Mayblum |
| 2010/0299398 A1 | 11/2010 | Nagoya et al. |
| 2013/0218595 A1* | 8/2013 | Burkett ................. G16H 20/10 |
| | | 705/2 |
| 2014/0006158 A1* | 1/2014 | Cooper ................. G06Q 30/02 |
| | | 705/14.56 |
| 2014/0087697 A1* | 3/2014 | Johnston ................. H04W 4/12 |
| | | 455/412.1 |
| 2014/0279455 A1 | 9/2014 | Browne et al. |
| 2014/0279456 A1 | 9/2014 | Browne et al. |
| 2015/0081488 A1* | 3/2015 | Turner ................. G06Q 10/107 |
| | | 705/34 |
| 2015/0242897 A1* | 8/2015 | Dinardo, Jr. ......... G06Q 20/322 |
| | | 705/14.56 |
| 2015/0363831 A1* | 12/2015 | Friborg, Jr. ........... H04L 51/214 |
| | | 705/14.55 |
| 2016/0255031 A1 | 9/2016 | Sasaki |
| 2018/0005263 A1* | 1/2018 | McNulty ............ G06Q 30/0269 |
| 2018/0096160 A1 | 4/2018 | Ciancio-Bunch et al. |

FOREIGN PATENT DOCUMENTS

| | | |
|---|---|---|
| JP | 2004-086236 A | 3/2004 |
| JP | 2011-526027 A | 9/2011 |
| JP | 5843997 B1 | 1/2016 |
| JP | 2016-29570 A | 3/2016 |
| JP | 2016-519814 A | 7/2016 |
| JP | 2017-021453 A | 1/2017 |
| JP | 6338311 B1 | 6/2018 |
| JP | 6362055 B1 | 7/2018 |
| JP | 2019-086920 A | 6/2019 |
| JP | 2019-114054 A | 7/2019 |
| WO | 2008/062542 A1 | 5/2008 |
| WO | 2015/114757 A1 | 8/2015 |

\* cited by examiner

| RECORD NO. | CLIENT ID | MESSAGE DELIVERY SERVICE ID | PHONE NUMBER OF USER | Opt-in=1 Opt-out =0 | THE NUMBER OF TIMES OF TRANSMISSION | THE NUMBER OF TIMES OF INHIBITION |
|---|---|---|---|---|---|---|
| m1 | 001 | 1 | 44444444 | 1 | 1 | 0 |
| m2 | 001 | 1 | 10101010 | 0 | 1 | 2 |
| m3 | 001 | 2 | 66666666 | 1 | 2 | 0 |
| m4 | 002 | | 52525252 | 0 | 6 | 2 |
| m5 | 002 | | 69696969 | 1 | 0 | 0 |

FIG. 6A

| RECORD NO. | CLIENT ID | DELIVERY SERVICE ID | RECEPTION PHONE NUMBER |
|---|---|---|---|
| n1 | 001 | 1 | 123456789 |
| n2 | 001 | 2 | 111111111 |
| n3 | 002 | | 222222222 |
| n4 | 003 | | 555555555 |

FIG. 6B

MESSAGE COMMUNICATION METHOD AND STORAGE MEDIUM FOR CONTROLLING TRANSMISSION OF MESSAGES BASED ON AN OPT-IN OR OPT-OUT STATUS

CROSS-REFERENCE TO RELATED APPLICATIONS

This application is a continuation of International Application Serial No. PCT/JP2021/040146, filed Oct. 29, 2021, which claims priority to Japanese Patent Application No. 2020-194563, filed Nov. 24, 2020. The contents of these applications are incorporated herein by reference in their entirety.

TECHNICAL FIELD

The present disclosure relates to a message communication method and a storage medium storing a program.

BACKGROUND ART

There is a case where an entity (a business operator) who conducts business activities such as a company sends a message, which is addressed to a phone number, to a mobile terminal possessed by a customer or a potential customer of the business, as part of the activities.

Currently, a plurality of communication carriers provide a plurality of types of message communication protocols such as SMS, MMS, or RCS, which use phone numbers as destinations. Under such circumstances, large development investments are required for each company to construct a message communication system individually in conformity to each of the plurality of communication carriers and a plurality of message communication methods.

For this reason, there are gateway service providers (hereinafter, referred to as "business operators") who provide achievement of message deliveries which meet the needs of company activities between companies and a plurality of communication carriers.

In addition, there are also message service operators who specialize in providing message communications such as messages associated with chats and SNS, and message service operators based on chats associated with phone numbers of users. There is also a case where such a message service operator provides a service to achieve a message delivery from a client of the message service operator to users of the client in the form of mediation between the client and the users of the client. In this case, as the destination of a message, not a phone number but ID of the user or an address allocated to the user is often used. There are cases where these IDs or addresses uniquely correspond to phone numbers. In addition, many communication carriers for mobile phones provide users of mobile phones with mail addresses uniquely corresponding to the phone numbers of the mobile phones.

These IDs, addresses, and mail addresses are addresses that are associated with phone numbers or are provided upon verification of users, which is almost the same as in the case of the phone numbers. In the present Description, such ID, address, mail address is referred to as an "address equivalent to the phone number". Hereinafter, description is given by using the term "phone number"; however, description using the "phone number" may be read instead with the "address equivalent to the phone number". A message service operator using addresses equivalent to phone numbers is also dealt with as belonging to "business operators" in the present Description.

An entity who mediates between a client and users of the client to perform a message delivery from the client to the users of the client is referred to as a business operator. In this way, the message delivery from a client to users of the client is achieved by a business operator providing a service to deliver messages to the users of the client or by the business operator instructing a communication carrier to provide the service based on an instruction from the client.

In this way, there are business operators who mediate message delivery services between clients and users of the clients, and the business operators provide message delivery services with which individual clients can easily perform message delivery to the users of the clients without constructing systems that support a plurality of message communication methods provided by a plurality of communication carriers by themselves.

In addition, the meanings of the other expressions used in the present Description are as follows. The expression "the user subscribes the message delivery service" means that the user is in the state where the user can receive the message delivery service. The expression "the user opts in to the message delivery service" means that the user is in the state where the user can subscribe the message delivery service. The expression "the user opts out of the message delivery service" means that the user is the state where the user moves out of the state where the user can subscribe the message delivery service. Note that the expression "the user unsubscribes the message delivery service" is often used as the same meaning as the expression "the user opts out of the message delivery service". In addition, the noun form of subscribe is subscription. In the present Description, the terms "opt-in", "opt-out", "subscribe", and "subscription" are used.

In the case where a business operator mediates message delivery from a client to users of the client, a message which a user does not want to receive is sometimes delivered. In this case, the user opts out of a message delivery service which the user subscribed so that the phone number of a terminal possessed by the user will become exempt from the message delivery service. In addition, by opting in to a message delivery service, the user subscribes the message delivery service.

Opt-in is achieved by the user notifying a client of the phone number of the user as an example.

Opt-out includes the following techniques, for example.

For example, a management server includes an opt-out phone number storage unit, and in a case where input of "unsubscription" is received from a web page which is displayed on a mobile phone device, the user phone number is stored in the opt-out phone number storage unit. In addition, in a case where input of "resubscription" is received from a web page, the user phone number corresponding to the web page is deleted from the opt-out phone number storage unit. There is a technique in which when a short message is to be transmitted, the opt-out phone number storage unit is searched, and in a case where the user phone number is stored in the opt-out phone number storage unit, the short message is not transmitted (see, for example, Patent Document 1).

There is a technique in which an URL that allows opt-out is written in an opt-out message, and the user opts out by indicating the URL, and also writes a phone number that allows opt-out, and in a case where the user makes a phone call to the phone number, the user is replied with an interactive voice response, and opts out by registering the phone number of the user in a no delivery list (see, for example, Patent Document 2).

A no-delivery determination unit determines whether or not a destination of a short message transmitted from an information terminal device is a destination to which a short message is rejected. Specifically, there is a technique in which the no-delivery determination unit determines whether or not a destination of a short message is a destination to which a short message is rejected from whether or not the destination is stored in an opt-out destination storage unit (see, for example, Patent Document 3).

Services for opt-out provided by business operators have conventionally been simple services such as recording phone numbers to opt out, and detailed services have not been provided to users. In addition, there have also been various procedures for opt-in.

PRIOR ART DOCUMENT

Patent Document

Patent Document 1: Japanese Patent No. 6362055
Patent Document 2: Japanese Patent No. 6338311
Patent Document 3: Japanese Patent No. 5843997

SUMMARY

Problem to be Solved

An object of the disclosed technique is to provide a message communication that enhances the convenience of users in terms of changing of subscriptions of users to a message delivery service.

The disclosed technique provides a message communication method comprising: receiving, from a client providing a message delivery service to a user of the client, an address of the user and a message to be transmitted to the address, the address being a phone number of the user or an address equivalent to the phone number; searching a database by using the address and outputting a first search result; associating the address with an opt-in status and storing the address in the database in a case where the first search result indicates that there was no hit for the address; controlling transmission of the message in such a manner as to inhibit the transmission of the message to the address in a case where the first search result indicates that the address has an opt-out status, and to transmit the message to the address in a case where the first search result indicates that the address has an opt-in status or that there was no hit for the address.

The disclosed technique provides a message communication method further comprising, in response to communication addressed to a predetermined address, extracting a source address of the communication; searching the database by using the source address to acquire a second search result; and updating the database based on information including the source address and the second search result.

In addition, the disclosed technique can provide a non-transitory storage medium storing a program that causes a computer to execute the above-described method.

Advantageous Effect

The disclosed technique can provide a message communication that enhances the convenience of users in terms of changing of subscriptions of the users to a message delivery service.

DETAILED DESCRIPTION

As already described, the following description is made by giving a phone number as an example of an address to which a message is delivered; however, as already described, it goes without saying that the address to which a message is delivered is not limited to a phone number, but may be an address equivalent to the phone number. In addition, as already described, it should be noted that in the following embodiment, the "telephone number" and the "address equivalent to the phone number" are sometimes referred to simply as the "address".

The embodiment of the method disclosed in the present Description and drawings is achieved by using a computer such as a server device under the control of a business operator. The embodiment of the method disclosed in the present Description and drawings is achieved by using a computer such as a server device under the control of a business operator.

In the present Description and drawings, a client provides a business operator with information including a phone number of a user of the client and a message. The business operator transmits the message by itself or gives a communication carrier an instruction to transmit the message so that the message addressed to the phone number reaches the user as appropriate based on the received information including the phone number and the message.

In the present Description and drawings, the transmission of a message is described by giving a communication in which the message is transmitted from the client to the user as an example; however, it goes without saying that the transmission of a message may be a two-way communication in which transmission or response from the user to the client is permitted.

In addition, it goes without saying that the content of a message is not limited to a text, but also may be information other than a text, such as an image, a video, a voice, or a program.

Note that relations among clients, a business operator, communication carriers, and users are described later by using FIG. 4.

Figure 1A:
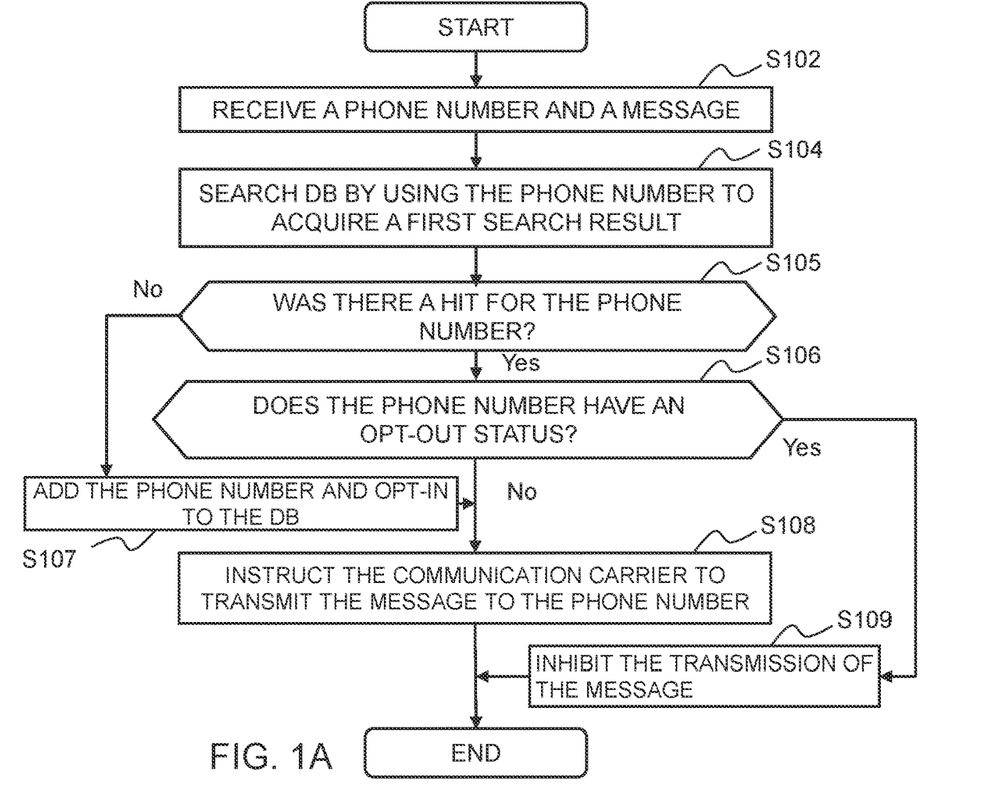
FIG. 1A is a flowchart showing a procedure for controlling transmission of a message depending on a state of a message delivery service.
Figure 1B:
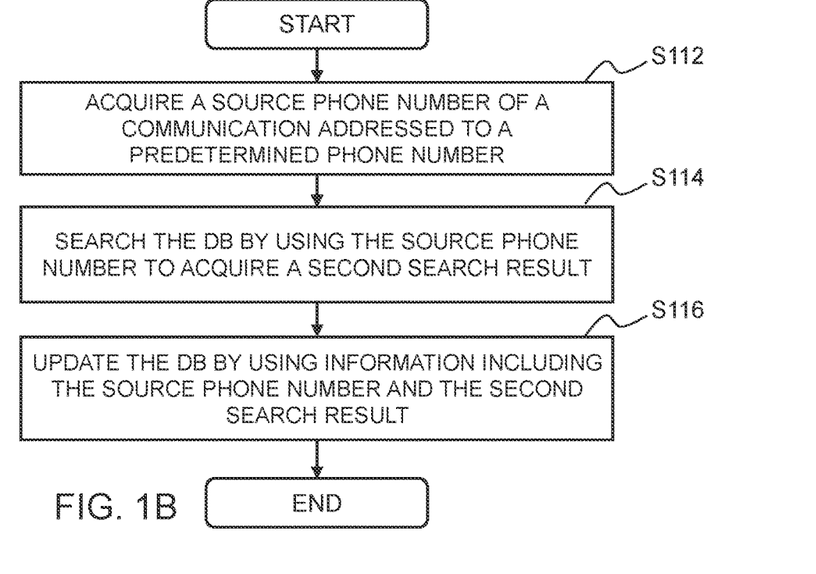
FIG. 1B is a flowchart showing a procedure for updating a database by using information including a source phone number.

FIG. 1A is a flowchart showing a procedure for controlling transmission of a message depending on a state of a message delivery service. FIG. 1B is a flowchart showing a procedure for updating a database by using information including a source phone number.

By the procedure shown in FIG. 1A, it is possible to provide a communication carrier or the like with an instruction for transmitting a message in such a manner that the message is transmitted to the user as appropriate based on the information including the message and the phone number of destination of the message received from the client.

Each step shown in FIG. 1A is described below.

[Step S102] Information including a phone number of a terminal used by a user and a message to be transmitted to the phone number is received. The information received from the user may include ID (identification information) of a message delivery service, which is described later, and the like. Note that the phone number may be stored in a storage unit managed by the business operator in advance. In this case, selection of this stored phone number and a message associated with the selected phone number may be received from the client. The storage unit that stores the phone number may be a database which is described below.

[Step S104] The database is searched with the received information including the phone number to obtain a first search result. In a case where the user already opted out of the message delivery service, information indicating this is stored in the database, as described later. An example of how the database is constructed is described later by using FIG. 4, FIG. 6, and the like.

[Step S105] It is checked whether or not there was a hit for the phone number came up (whether or not the phone number is present in the database). If the check is positive (Yes), the processing proceeds to Step S108. If the check is negative (No), the processing proceeds to Step S107. Note that it is obvious that in a case where a phone number stored in the database was selected by a client, there invariably is a hit for the phone number when the database is searched.

[Step S106] It is checked whether or not the phone number has an opt-out status in the first search result. If the check is positive (Yes), the processing proceeds to Step S109. If the check is negative (No), the processing proceeds to Step S108.

[Step S107] In the case where there was no hit for the phone number in the first search result (in the case of No in Step S105), a record in which the phone number is associated with an opt-in status is added to the database.

[Step S108] In the case where the phone number does not have an opt-out status in the first search result (in the case of No in Step S106), the communication carrier is instructed to transmit a message to the phone number. Note that the case where the phone number does not have an opt-out status also includes the case where there is no record related to the phone number in the database (the case where the processing proceeded through Step S107).

[Step S109] In the case where the phone number has an opt-out status in the first search result (in the case of Yes in Step S106), the transmission of the message to the phone number is inhibited. In this case, the business operator does not transmit the message by itself, or does not instruct the communication carrier to transmit the message.

There are various moments for opt-in such as the case where a user becomes a member for a service provided by a client and the case where a user frequently browses a website in which the user can opt in to a message delivery service. In addition, it is often the case that a website that actively guides users to opt in is constructed also in a system possessed by a client. On the other hand, it is often the case that a client cannot sufficiently invest the development in creating better functions related to the opt-out mechanism.

Since in the disclosed technique, information on opt-out is appropriately held in the database of the business operator, it is possible for the business operator to inhibit transmission of a message as appropriate even in the case where a client instructed the business operator to deliver the message to the user who already opted out.

FIG. 1B is a flowchart showing a procedure for updating a database by using information including a source phone number. Each step is described below.

[Step S112] A source phone number of a communication addressed to a predetermined phone number is acquired. It is desirable that this predetermined phone number is a different phone number for each of a plurality of clients. In addition, in a case where a certain client has a plurality of message delivery services, it is desirable that the predetermined phone number is a different phone number for each of the message delivery services. Note that it is desirable that the terminal used by the user is a terminal having a phone number for opting in to or opting out of a message delivery service.

The predetermined phone number may be presented on a web page of the business operator. Alternatively, this predetermined phone number may be written in a transmitted message. Alternatively, this predetermined phone number may be acquired by the user following the URL written in a transmitted message. In addition, the embodiment is not limited to the predetermined phone number, and an address other than a phone number, that allows a source address to be acquired through communications to a predetermined address, may be used.

In this way, it becomes possible to make a phone call to the predetermined phone number from the terminal of the user. In the case where the business operator received this phone call, the business operator can uniquely specify to which message delivery service of which client this phone call is directed. In addition, by specifying the source phone number of the phone call, the business operator can specify the phone number of the destination of a message in the message delivery service, for opting in to or opting out of the message delivery service.

[Step S114] The database is searched by using the source phone number to acquire a second search result.

[Step S116] The database is updated by using information including the source phone number and the second search result.

For example, in a case where the source phone number is not stored in the database, there is a high possibility that the user wants to newly opt in to the message delivery service of the client.

When the user makes a phone call to the predetermined phone number in the case where the source phone number is stored in the database and has the opt-in status, there is a high possibility that the user wants to opt out of the message delivery service of the client.

When the user makes a phone call to the predetermined phone number in the case where the source phone number is stored in the database and has the opt-out status, there is a high possibility that the user wants to opt in to the message delivery service of the client again.

As described above, by using the second search result, it is possible to predict the need of the user who made a phone call to the predetermined phone number. Based on this prediction, a response with a phone call matching the user need of the user who made a phone call to the predetermined phone number can be returned to the user. In addition, the update of the database in conformity to the user need can be performed.

Figure 2:
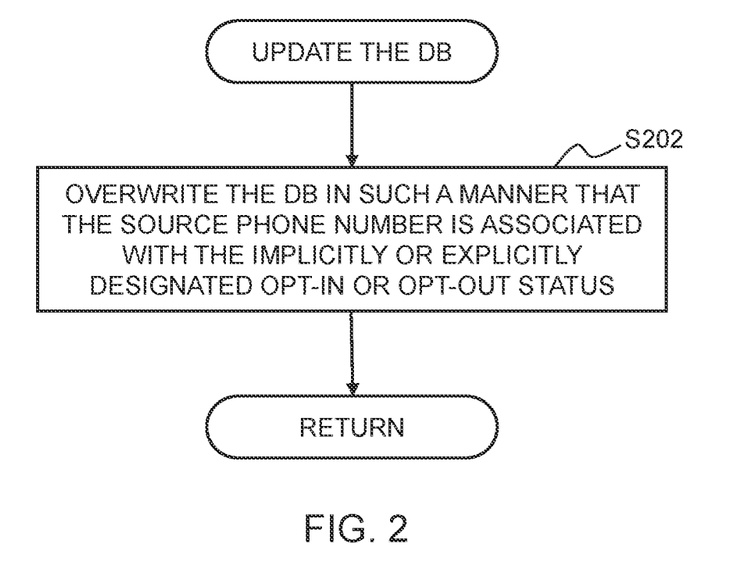
FIG. 2 is a flowchart showing a more detailed procedure for updating the database.

FIG. 2 is a flowchart showing a more detailed procedure for the process of Step S116 of updating the database. Each step is described below.

[Step S202] The DB is overwritten in such a manner that the source phone number is associated with the implicitly or explicitly designated opt-in or opt-out status.

Implicitly indicates, for example, the case where the user did not make an instruction when the user made a phone call to the predetermined phone number. Explicitly indicates the case where the user specifically made an instruction.

As described in Step S116, in the case where the source phone number is not stored in the database, or in the case where the source phone number is stored in the database and has the opt-out status, there is a high possibility that the user wants to opt in to the message delivery service of the customer. That is, in these cases, it is desirable to recognize that the user is implicitly instructing opt-in. Hence, for example, even in the case where the user did not make an instruction when making a phone call to the predetermined phone number, it is desirable to perform the opt-in process as a default. That is, it is desirable to associate the opt-in status with the phone number of the user, which is the source phone number, and store the opt-in status in the database.

In addition, in the case where the source phone number is stored in the database and has the opt-in status, there is a high possibility that the user wants to opt out of the message delivery service of the customer. Hence, when the user made a phone call to the predetermined phone number, even in the case where the user did not make an instruction, it is desirable to perform the opt-out process as a default. That is, it is desirable to associate the opt-out status with the source phone number and store the opt-out status in the database.

Note that it is also conceivable that the user wants a process opposite to the above-described default processes. Hence, it is desirable for the business operator to add an inquiry that allows the user to explicitly designate opt-in or opt-out by using an interactive voice response (IVR) or the like when a phone call was made to the predetermined phone number. In this case, the business operator can explicitly receive, from the user, an instruction for the opt-in or opt-out process in line with the intention of the user.

Alternatively, it is also conceivable that the user made a phone call to a wrong phone number different from the predetermined phone number. In this case, it is desirable to prevent opt-in or opt-out setting from being made in a message delivery service which is not intended by the user. For example, when the user made a phone call, it is desirable to notify the user in such a manner that the user can specify a message delivery service to or of which the user opts in or opts out by using IVR or the like. In this way, it is possible to prevent the user from opting in to or opting out of a wrong message delivery service even when the user made a phone call to a wrong phone number.

Figure 3:
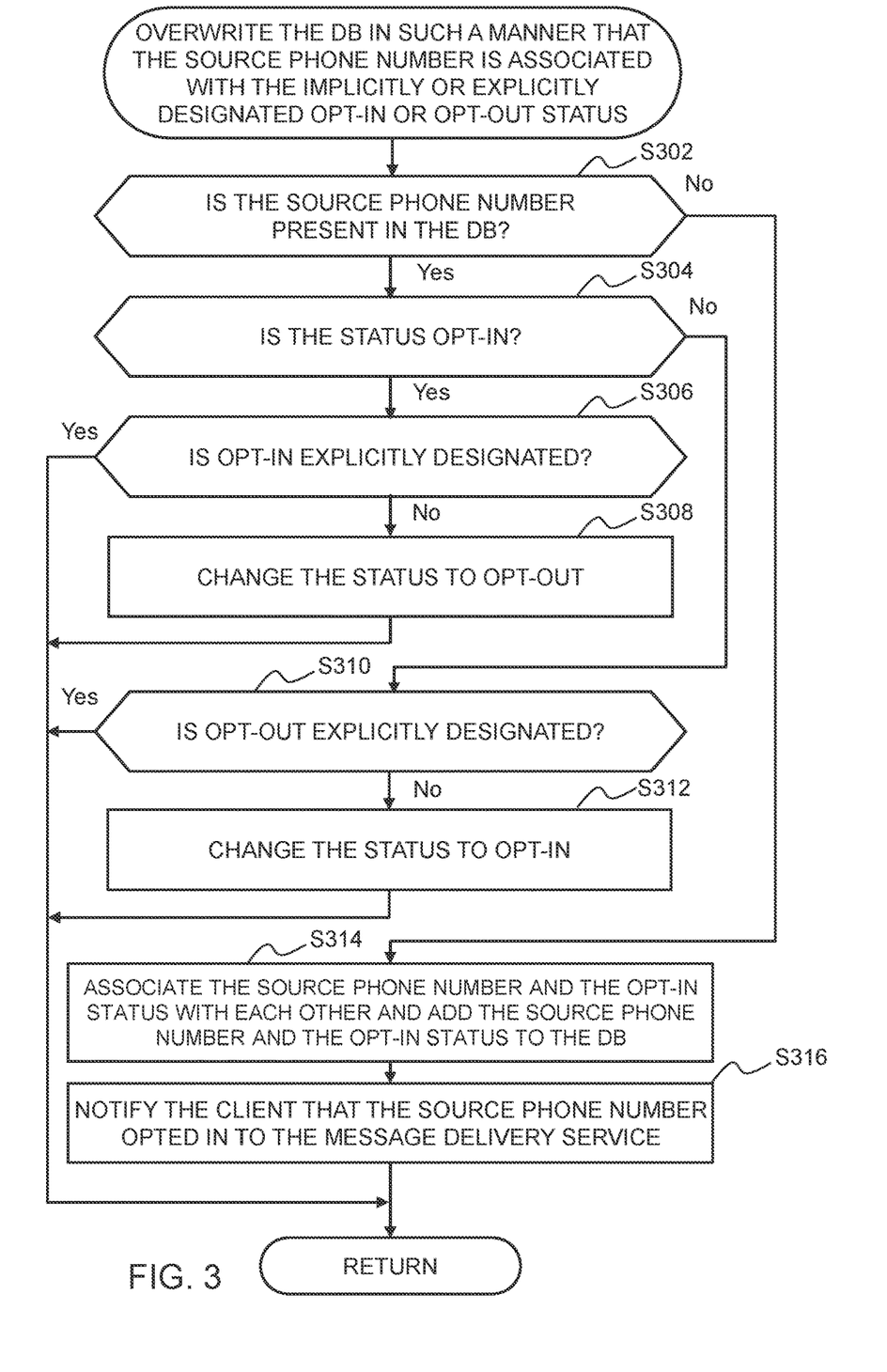
FIG. 3 is a flowchart showing a procedure for overwriting the database by using a source phone number.

FIG. 3 is a flowchart showing a detail of a procedure in Step S202 for overwriting the database by using a source phone number. That is, the detail of the process of overwriting the database in such a manner that the source phone number is associated with the implicitly or explicitly designated opt-in or opt-out status is shown. Each step is described below.

[Step S302] It is checked whether or not the source phone number is present in the database. If the check is positive (Yes), the processing proceeds to Step S304. If the check is negative (No), the processing proceeds to Step S314.

[Step S304] In the case where the source phone number is present in the database (in the case of Yes in Step S302), it is checked whether or not the status associated with the source phone number is opt-in. If the check is positive (Yes), the processing proceeds to Step S306. If the check is negative (No), the processing proceeds to Step S310.

[Step S306] It is checked whether the user explicitly designated opt-in. If the check is positive (Yes), the processing proceeds to "Return". If the check is negative (No), the processing proceeds to Step S308.

For example, a response as described below may be made as interactive voice response in the predetermined phone number.

(1) "The settings of the oo message delivery service are changed. The transmission of messages will be canceled. If you want another process, please press "1". If you want to cancel the transmission of messages, please hang up now."

(2) "The settings of the oo message delivery service are changed. The transmission of messages will be canceled."

As in the above-described (2), a process that does not accept an explicit instruction for processing from the user may be performed. In this case, it is desirable that if the user does not want the processing, the user can revert the state by making a phone call to the predetermined phone number again.

Note that the message "The settings of the oo message delivery service are changed" is a message that allows the user to check whether or not the user made a phone call to the appropriate predetermined phone number by him or herself.

[Step S308] The status associated with the source phone number is changed to opt-out. In this case, since the source phone number is present in the database and the status thereof is opt-in, it can be surmised that there is a high possibility that the user wants opt-out. Hence, if there is no instruction from the user, the process of recording opt-out in the database may be executed as a default process.

[Step S310] It is checked whether the user explicitly designated opt-out. If the check is positive (Yes), the processing proceeds to "Return". If the check is negative (No), the processing proceeds to Step S312.

For example, a response as described below may be made as interactive voice response in the predetermined phone number.

(3) "The settings of the oo message delivery service are changed. The transmission of messages will be resumed. If you want another process, please press "1". If you want to resume the transmission of messages, please hang up now."

(4) "The settings of the oo message delivery service are changed. The transmission of messages will be resumed."

As in the above-described (4), a process that does not accept an explicit instruction for processing from the user may be performed. In this case, it is desirable that if the user does not want the processing, the user can revert the state by making a phone call to the predetermined phone number again.

[Step S312] The status associated with the source phone number is changed to opt-in. In this case, since the source phone number is present in the database and the status thereof is opt-out, it can be surmised that there is a high possibility that the user wants opt-in. Hence, if there is no instruction from the user, the process of recording opt-in in the database may be executed as a default process.

[Step S314] Since this is the case where the source phone number is not present in the database (in the case of No in Step S302), there is a high possibility that the user wants opt-in. Hence, it is desirable that the source phone number and the opt-in status be associated with each other and added to the database.

For example, a response as described below may be made as interactive voice response in the predetermined phone number.

(5) "The transmission of messages will be started. If you want another process, please press "1". If you want to start the transmission of messages, please hang up now."

(6) "The transmission of messages will be started."

As in the above-described (6), a process that does not accept an explicit instruction for processing from the user may be performed. In this case, it is desirable that if the user does not want the processing, the user can set the state where there was no instruction from the user by making a phone call to the predetermined phone number again (a wrong phone number in the case where the user made a phone call to the wrong phone number).

Figure 4:
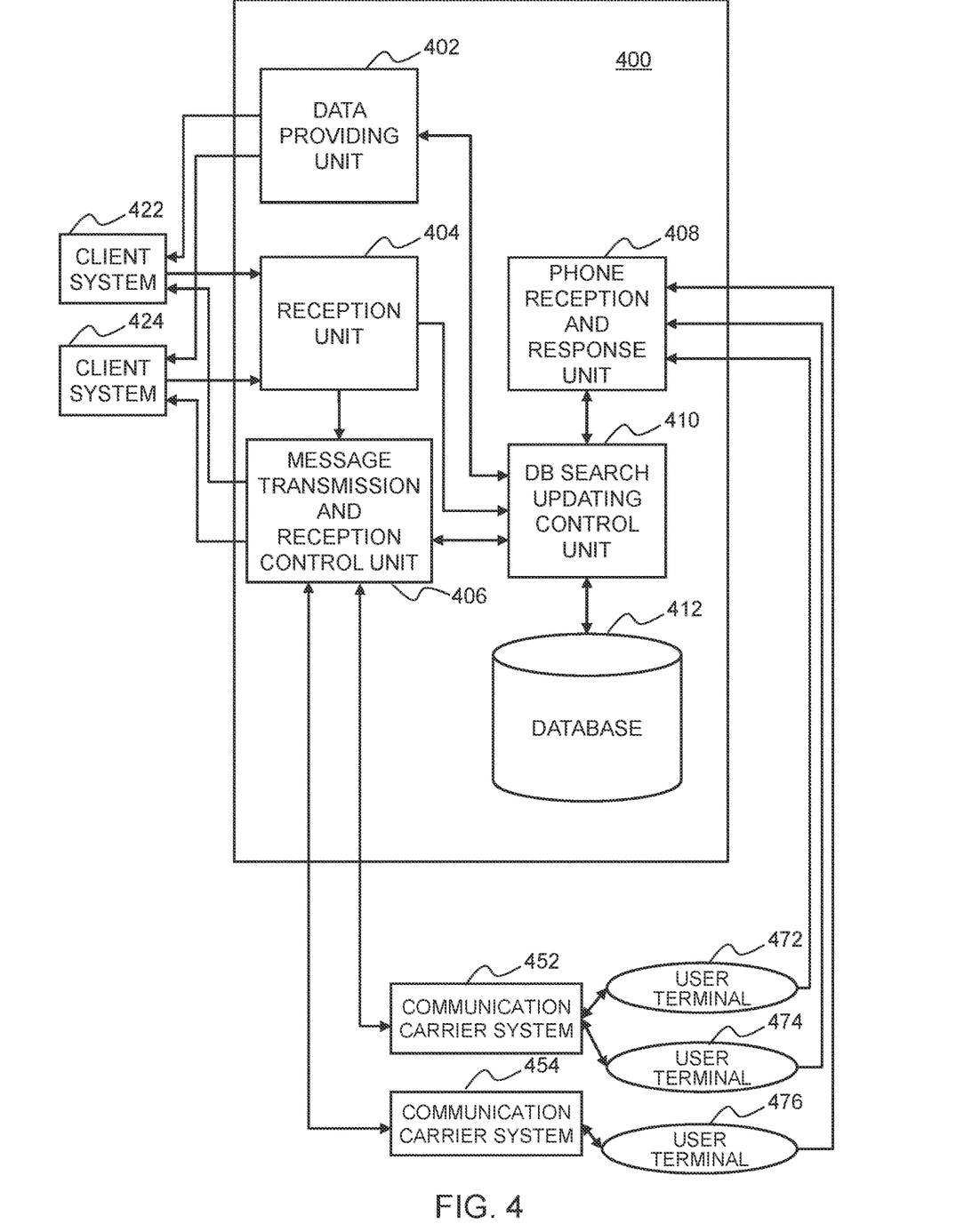
FIG. 4 is a functional block diagram of a message communication system.

FIG. 4 is a functional block diagram of a message communication system 400.

The message communication system 400 includes a data providing unit 402, a reception unit 404, a message transmission and reception control unit 406, a phone reception and response unit 408, a DB search updating control unit 410, and a database 412. Note that the message transmission and reception control unit 406 can request a communication carrier system 452 or a communication carrier system 454 to transmit messages, and may have a function to perform a two-way communication in addition to the transmission of messages.

The data providing unit 402, the reception unit 404, and the message transmission and reception control unit 406 are connected to a client system 422 and a client system 424.

The summary of the operation of the message communication system 400 is as follows.

The message transmission and reception control unit 406 is connected to the communication carrier system 452 and the communication carrier system 454.

The communication carrier system 452 can be connected to a user terminal 472 and a user terminal 474. The communication carrier system 454 can be connected to a user terminal 476.

The user terminal 472, the user terminal 474, and the user terminal 476 can perform phone communications with the phone reception and response unit 408.

The reception unit 404 receives information including a phone number and a message from the client system 422 or the client system 424. The reception unit 404 may further receive ID of the message delivery service from the client system 422 or the client system 424 in order to specify the message delivery service. The reception unit 404 can transmit the received message and phone number to the message transmission and reception control unit 406. In addition, the reception unit 404 provides the received phone number and ID of the message delivery service to the DB search updating control unit 410. The DB search updating control unit 410 searches the database 412 for the status of the phone number by using the phone number and the ID of the message delivery service to acquire the first search result. The message transmission and reception control unit 406 controls the transmission of a message by determining which one of the communication carrier system 452 and the communication carrier system 454 to request to transmit the message to the phone number based on the first search result.

In the case where there was no hit in the above-described search, the DB search updating control unit 410 may associate the phone number with the opt-in status and store the phone number in the database 412. The DB search updating control unit 410 may receive and store, in the database 412, the determination on the transmission of the message made by the message transmission and reception control unit 406.

In the case where there is a phone call, the phone reception and response unit 408 provides the destination phone number and the source phone number to the DB search updating control unit 410. The DB search updating control unit 410 searches the database 412 by using the destination phone number and the source phone number. If the source phone number is not stored in the database 412, the DB search updating control unit 410 may update the database 412 in such a manner as to associate the source phone number with an opt-in status. If the source phone number is stored in the database 412, the DB search updating control unit 410 may change the status associated with the source phone number from opt-in to opt-out, or from opt-out to opt-in.

In addition, in the case where an explicit instruction is received from the user, the phone reception and response unit 408 provides the instruction to the DB search updating control unit 410. The DB search updating control unit 410 may update the status associated with the source phone number in the database 412 in accordance with the instruction.

Note that the contents of the database 412 may be provided to the client system 422 or the client system 424 by the data providing unit 402 as appropriate. Information possessed by the client system 422 or the client system 424 may be updated with the provided contents of the database 412. In addition, it goes without saying that the client system. 422 or the client system 424 may store an initial value in the database 412 or update the database 412.

Note that in the case where not phone numbers but values generated by a function that generates values uniquely defined from phone numbers are accumulated in the database 412, there is a case where it is undesirable to provide the function to clients from the viewpoint of security. In this case, a service such as that of allowing clients to search the database 412 for the clients may be provided to the clients.

Figure 5:
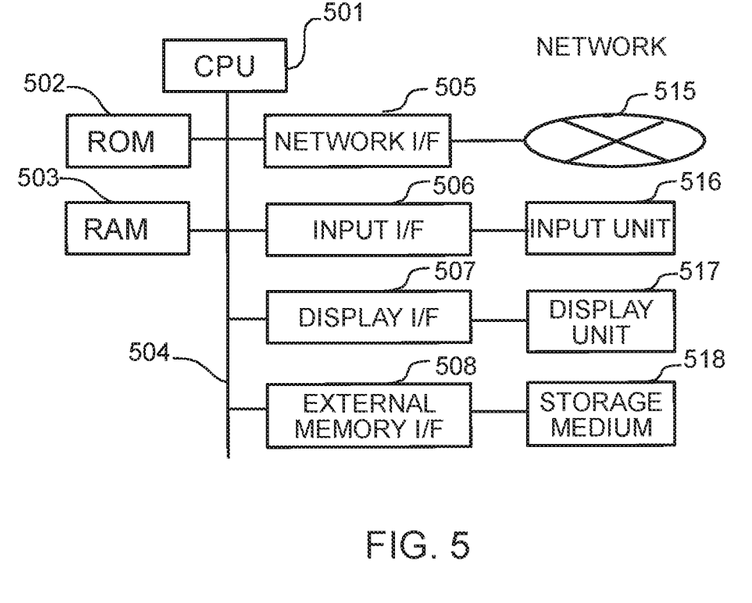
FIG. 5 is a hardware configuration diagram of the message communication system.

FIG. 5 is a diagram showing each hardware configuration of the embodiment. The hardware configuration includes a CPU 501, a ROM 502 in which programs and data of the present embodiment may be stored, a RAM 503, a network interface 505, an input interface 506, a display interface 507, and an external memory interface 508. These units of hardware are connected to one another through a bus 504.

The network interface 505 is connected to a network 515. The network 515 includes a wired LAN, a wireless LAN, the Internet, a cellular network, and the like. To the input interface 506, an input unit 516 is connected. To the display interface 507, a display unit 517 is connected. To the external memory interface 508, a storage medium 518 is connected. The storage medium 518 may be a RAM, a ROM, a CD-ROM, a DVD-ROM, a hard disk, a memory card, an USB memory, or the like.

The programs and methods for achieving the above-described embodiment may be executed by a computer equipped with the hardware configuration shown in FIG. 5.

Figure 6A:
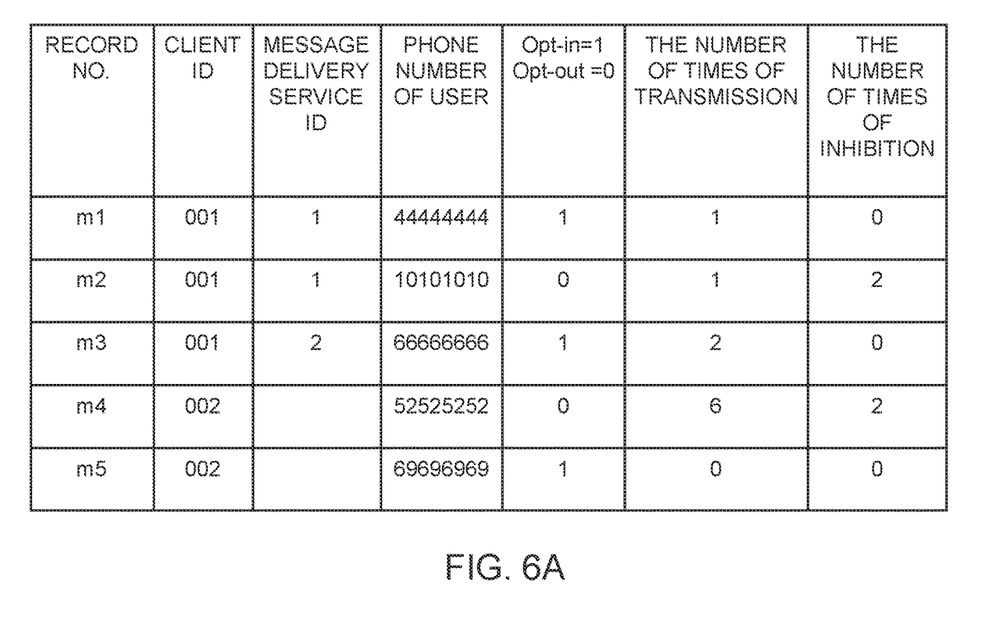
FIGS. 6A and 6B are diagrams showing specific examples of records of the database.
Figure 6B:
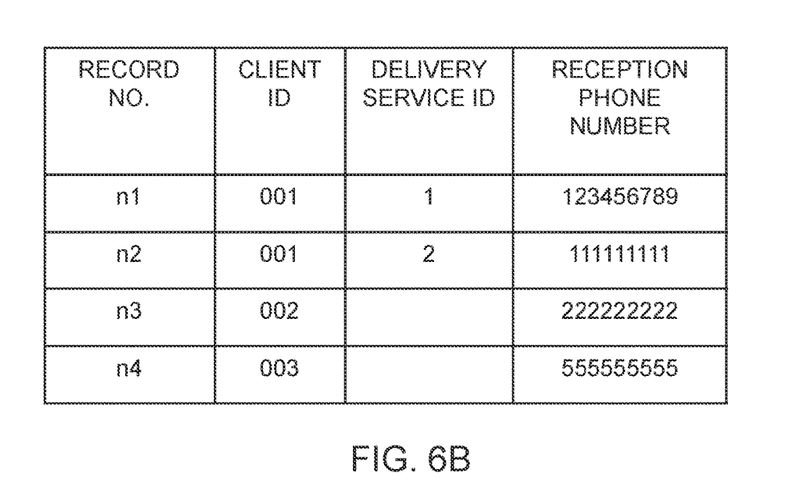

FIGS. 6A and 6B are diagrams showing specific examples of records of the database. FIG. 6A is a diagram showing examples of entries of users to a message delivery service of a client. FIG. 6B is a diagram showing predetermined phone numbers uniquely provided to message delivery services of clients.

In FIG. 6A, record numbers m1 to m3 indicate entries of a client 001. The client 001 has two message delivery services, that is, a message delivery service having ID of 1 and a message delivery service having ID of 2. For example, the record number m1 indicates that the client ID is 001, the ID of the message delivery service is 1, the phone number of the user is "44444444" and has an opt-in status, the number of times a message was transmitted is 1, and the number of times the transmission of a message was inhibited is 0.

Note that FIG. 6A shows an example in which phone numbers of users are recorded in the database as they are. Since the phone number of a user is personal information, it is possible to generate values generated by using a function that generates values uniquely defined from phone numbers and accumulate the generated values in the database instead of phone numbers. In this case, when the database is searched, it is only necessary to obtain a value obtained by applying the function to a phone number to search for and to search the database using the value thus obtained. In this way, it is possible to prevent phone numbers of users from leaking even when the contents of the database are leaked. Note that when addresses equivalent to phone numbers are used instead of phone numbers as well, it is possible to enhance the security of the database in which addresses equivalent to phone numbers are accumulated by conducting the same approach as the above-described approach for phone numbers.

In addition, the record number m2 indicates that the status is opt-out, the number of times a message was transmitted is 1, and the number of times the transmission of a message was inhibited is 1. Hence, it can be seen that this user requested opt-out after a message was transmitted once, and the phone number "10101010" of this user thus currently has an opt-out status.

The record m5 indicates that the record m5 is currently in as opt-in status, but the number of times a message was transmitted and the number of times the transmission of a message was inhibited are both 0. Hence, it can be seen that the user of the phone number "69696969" is a user who made a phone call to the predetermined phone number and requested opt-in shortly before, and was notified that the user opted in to the client.

Note that it can be seen that since the client having the client ID of 002 has one message delivery service, the client does not have the entry of IDs of message delivery services. In this way, for a client having only one message delivery service, the entry of IDs of message delivery services may be vacant.

By having a database with the structure as shown in FIG. 6A, it is possible to appropriately inhibit the transmission of a message to a phone number of a user having the entry of opt-out and also to appropriately receive a request for opt-in from the user, and it is thus possible to promptly provide information on the user of opt-in to the client.

FIG. 6B is a diagram showing an example of contents of a database that holds predetermined phone numbers uniquely allocated to correspond respectively to combinations of clients and message delivery services.

As shown in the record numbers n1 and n2, since each client having client ID of 001 has two message delivery services, the client has two IDs of message delivery services of 1 and 2. Then, different predetermined phone numbers are allocated to the respective message delivery services.

By making a phone call to an appropriate predetermined phone number, a user can instruct opt-in or opt-out to an appropriate message delivery service of the client having client ID of 001.

This makes it possible to receive instructions of both opt-in and opt-out from users with the same predetermined phone number. Hence, the resources of predetermined phone numbers can be efficiently used.

Moreover, it is possible to easily find out information on users possessed by clients and provide clients with reception of opt-in and opt-out through phone calls by employing the above disclosed technique, and trouble of constructing a system for opt-in and opt-out through phone calls by clients themselves can be reduced or saved.

The steps of the operation flow disclosed in the present Description and drawings may be rearranged to be performed as long as there is no contradiction. In addition, a plurality of the steps may be executed simultaneously. Each step may be achieved by executing a program stored in a memory. In addition, part of the steps may be achieved by an operating system or hardware. In addition, it is not necessary that all the steps are executed, and execution of a certain one of the steps may be omitted. In addition, one of the steps may be executed multiple times. In addition, a plurality of the steps may be executed repeatedly.

The programs may be stored in a non-transitory computer-readable storage medium. The non-transitory memory includes a RAM, a ROM, an USB memory, a DVD, and the like, but is not limited to these.

In addition, each embodiment may be implemented as a hardware device.

In addition, each flow is not exclusive, and the flows may be combined as long as there is no contradiction.

That is, it goes without saying that techniques executed in different orders from the orders of the method or program described in claims or techniques in which some of the processes are executed simultaneously belong to the technical scope of the subject matter defined in the claims.

While several embodiments were described in the foregoing detailed description, those skilled in the art may make modifications and alterations to these embodiments without departing from the scope and spirit of the subject matter. It goes without saying that the above-described embodiments are for illustrating the subject matter defined in the claims and are not intended to limit the subject matter.

The invention claimed is:

1. A message communication method that can be executed by a computer under the control of a business operator comprising:

receiving, from a client of the business operator providing a message delivery service to a user of the client, an address of the user and a message to be transmitted to the address, the address being a phone number of the user or an address equivalent to the phone number;

searching a database by using the address and outputting a first search result;

associating the address with an opt-in status and storing the address in the database in a case where the first search result indicates that there was no hit for the address;

controlling transmission of the message in such a manner as to inhibit the transmission of the message to the address in a case where the first search result indicates that the address has an opt-out status, and to transmit the message to the address in a case where the first search result indicates that the address has an opt-in status or that there was no hit for the address; and in response to communication addressed to a predetermined address, extracting a source address of the communication;

searching the database by using the source address to acquire a second search result; and updating the database based on information including the source address and the second search result, wherein the updating includes:

checking whether or not the source address is present in the database;

in a case where the source address is present in the database, when a status related to the source address is opt-out and neither an opt-in nor opt-out status is explicitly designated by the user through the communication, changing the status to opt-in, and when the status related to the source address is opt-in and neither an opt-in nor opt-out status is explicitly designated by the user through the communication, changing the status to opt-out; and in a case where the source address is not present in the database, associating the source address with an opt-in status and adding the source address to the database.

2. The message communication method according to claim 1, wherein the predetermined address is an address uniquely allocated to the client.

3. The message communication method according to claim 1, wherein the receiving includes:

identifying the message delivery service, and the predetermined address is an address uniquely allocated to the identified message delivery service.

4. The message communication method according to claim 1, wherein a value obtained by using a function that converts the address to a uniquely defined value is stored in the database, and the function is used in searching the database.

5. The message communication method according to claim 1, further comprising:

providing the database to the client.

6. A non-transitory storage medium storing a program that causes a computer to execute the method according to claim 1.

* * * * *